No. 860,702. PATENTED JULY 23, 1907.
A. SORGE, Jr.
WATER PURIFYING APPARATUS.
APPLICATION FILED OCT. 7, 1904.
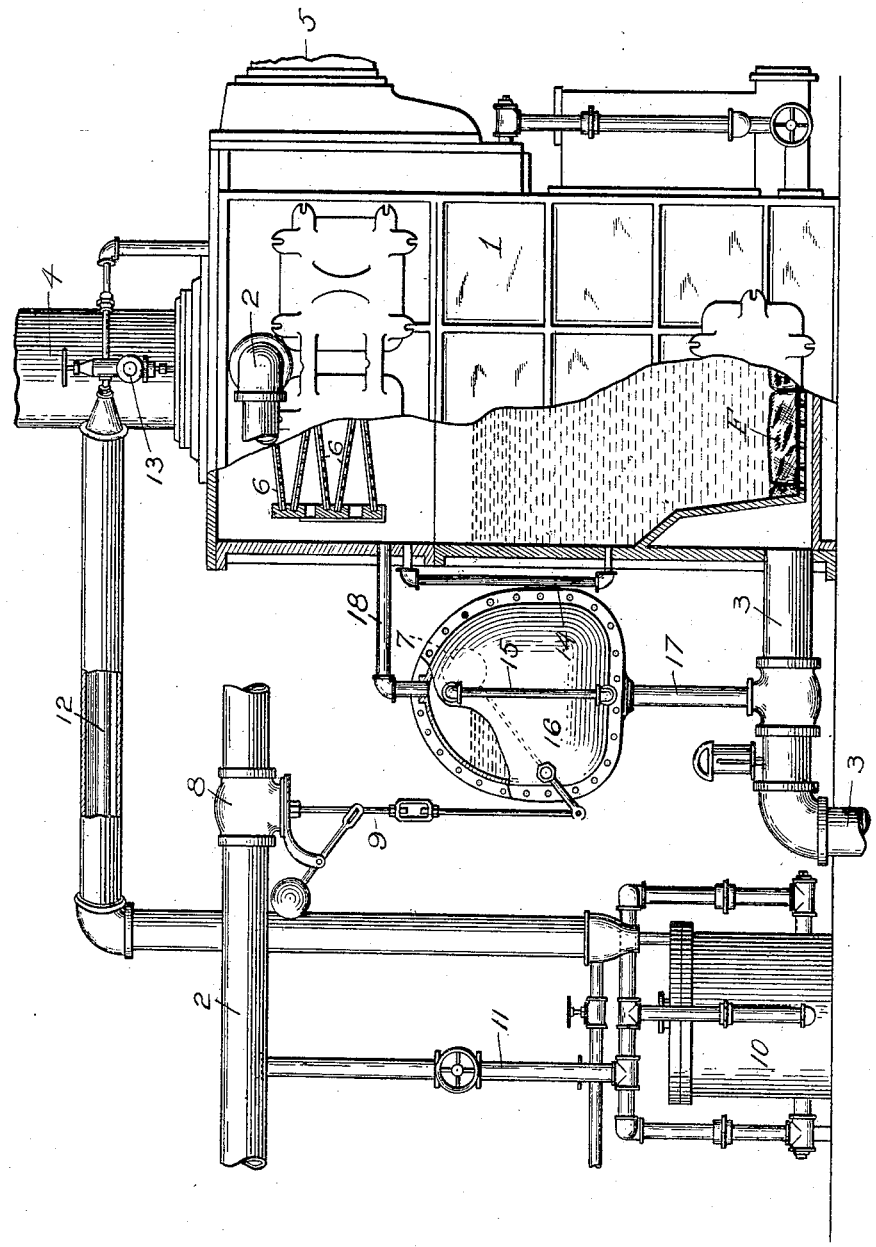

UNITED STATES PATENT OFFICE.

ADOLPH SORGE, JR., OF CHICAGO, ILLINOIS.

WATER-PURIFYING APPARATUS.

No. 860,702.  Specification of Letters Patent.  Patented July 23, 1907.

Application filed October 7, 1904. Serial No. 227,540.

*To all whom it may concern:*

Be it known that I, ADOLPH SORGE, Jr., a citizen of the United States, and a resident of Chicago, in the county of Cook and State of Illinois, have invented certain new and useful Improvements in Water-Purifying Apparatus, of which the following is a specification.

This invention relates to improvements in that class of water purifying apparatus comprising an "open" heater, in which the impurities that it is desired to be rid of are brought down or collected by the chemical action of reagents supplied for the purpose, and are then removed from the water by a filtration, as shown, for example, by my patent, No. 683,349, of Sept. 24, 1901.

One difficulty met with in the practical operation of such apparatus, as heretofore constructed, has been that the flow of water through the apparatus and out of its discharge pipe gradually decreases, owing to the accumulation of impurities in and upon the filter bed. The existence and amount of this difficulty has, furthermore, been difficult to determine. Ordinarily, a gage glass has been applied to the heater to reveal the water level therein, but in as much as the float of the regulator by which the supply of water to the heater is automatically controlled has been placed within the heater, the water level within the latter is maintained at the proper point, even though the flow through the heater may have been greatly reduced or entirely stopped, and the inlet valve of the regulator simply closing more and more as the filter becomes clogged, while the water level remains substantially constant. An inspection of the gage glass, under these circumstances, thus merely indicates that the supply of water to the heater has been ample to maintain the existing rate of outflow or discharge from the heater, and gives no information as to whether or not this outflow is normal in quantity.

An accumulation of impurities within and upon the filter bed is, of course, necessarily incident to water purifying systems of this character, but the present improvement contemplates a construction in which the extent of said accumulation or rather the resistance which it offers to the flow of water through the apparatus can be determined at a glance. To this end it involves the provision, in addition to the gage glass upon the heater, of a second gage glass connected with the outlet pipe so as to indicate the actual head or pressure under which water is being discharged into said pipe from the heater. And it also involves the regulation of the float of the automatic regulator valve in an exterior chamber connected with the outlet pipe, so that the flow of water into the heater will be regulated by the head or pressure in the outlet pipe, and not by the water level within the heater.

The invention consists of the matters thus and hereinafter set forth, and particularly pointed out in the appended claims, and will be fully understood from the following description of the accompanying drawing, showing a sectional side elevation of a feed heater and purifier embodying my invention in one form.

In said drawings, 1 designates a feed water heater of the open type or variety; 2 a supply pipe which discharges the feed water into the upper end of said heater; 3 the outlet pipe leading from the heater to the boilers (not herein illustrated), and 4 and 5 the inlet and exhaust pipes through which the steam from the engine is supplied to and conducted from the heater. The latter may be of any usual or desired construction, it being herein shown as provided at its upper portion with a series of inclined trays 6, upon the uppermost one of which the cold feed-water entering through the supply-pipe 2 is discharged to flow in a shallow stream over the succeeding lower trays, subject to the heating influence of the surrounding atmosphere of exhaust-steam, until it finally falls from the lowermost tray in a heated condition and collects in the lower portion of the heater, ready to be drawn off through the outlet pipe 3, leading to the boilers. A suitable float 7 controlling a valve 8 in the water supply pipe, through appropriate intermediate connections 9, is provided to regulate the admission of feed water in accordance with the rate at which it is drawn off to the boilers.

The chemical treatment of the feed-water is herein shown as accomplished by the provision of a chemical-tank 10, in which the desired reagent is placed and which is supplied with water under pressure from a suitable source conveniently through a connection 11, leading from the supply-pipe 2. The water entering through this connection becomes impregnated with the reagent and is then discharged back into the feed-water through a pipe 12, in which a sight-feed 13 is provided to enable its flow to be visually regulated. The impurities precipitated from the feed-water by this chemical treatment are then removed from the water, before it passes out of the heater, by a filter bed F, in the bottom of the heater. A gage glass, 14, provided on the side of the heater in a familiar manner, enables the level to which water rises within the heater to be readily observed.

In general the apparatus thus far described is similar to that disclosed in my patent No. 683,349, of Sept. 24, 1901, hereinbefore referred to, and the details of its construction have in themselves no particular relation to the present improvements, except as hereinafter particularly pointed out. Such improvements include a second gage glass 15 placed in connection with the outlet pipe 3 just outside of the heater. And they also include the locating of the float 7 of the regulator in a chamber 16 which is also provided in connection with the outlet pipe 3 just outside the heater. As herein shown, also, the lower end of the chamber 16 is connected with the pipe 3 by a short vertical pipe 17, while, to prevent the formation of any vacuum within the chamber, its upper end is connected with the interior of the heater at a point above the water level therein by an open pipe 18. The second gage glass is furthermore, in this instance, applied directly to the exterior of the chamber 16 and is thereby connected with the outlet pipe 3.

In general the operation of the apparatus thus described will be similar to that set forth in my previous patent, No. 683,349, of Sept. 24, 1901, hereinbefore referred to. By reason, however, of the location of the regulator float 7 in the chamber connected with the outlet pipe, instead of in the heater itself, or in the chamber directly connected to the heater, water will be admitted to the heater through the regulator valve 8 in sufficient quantities to normally maintain the head of water in the outlet pipe and in the chamber 17 connected therewith at any desired point. If now the accumulation of filtrates upon the filter bed F is sufficient to clog the filter and retard the flow therethrough to any considerable extent, the water in the outlet pipe will tend to be drawn off faster than it is discharged from the heater, and the level of the water in the chamber 16 will therefore lower, thus permitting the valve 8 to open and admit more feed water to the heater. This in turn will raise the water level or head in the heater and by placing the filter under greater pressure, cause a freer flow through it tending to make up the deficiency previously experienced in the amount of water discharged. At the same time the difference in the levels of the water in the heater and the water in the chamber 16, connected with the outlet pipe, as indicated by the two gage glasses 14 and 15, will apprise the attendant of the fact that the filter is becoming obstructed to a greater or less degree, according to the extent of the difference in the water levels, and he will thus be advised when the cleaning of the filter bed becomes necessary.

I claim as my invention:—

1. In a water purifying system, an open heater, a water supply pipe leading into said heater, a tank containing a chemical reagent, a chemical discharge pipe leading from said tank into said heater, a filter bed in the heater, an outlet passage leading from the filter bed, a chamber connected with said outlet, a float in said chamber, a controlling valve in the water supply pipe connected with said float and gage glasses both on the float chamber and on the heater, substantially as described.

2. A water purifying apparatus comprising an inlet pipe leading into a tank provided with a filter bed, an outlet leading from said tank and into which the water is discharged through the filter bed, a gage applied to the tank to indicate the water level therein, a gage glass connected with the outlet to indicate the head of water therein, a float located in a chamber connected with the outlet pipe, and a regulating valve in the inlet pipe connected with the said float to increase the admission of water to the tank as the head in the outlet pipe decreases, substantially as described.

3. A water purifying apparatus comprising an open heater, a water inlet pipe leading into said heater, means for discharging reagents into the entering water to separate the impurities therein, a filter bed in the heater for removing said impurities, an outlet leading from the heater and into which the water is discharged through said filter bed, a gage glass applied to the heater to indicate the water level therein, and a gage glass connected with the outlet to indicate the head of water therein, substantially as described.

4. A water purifying apparatus comprising an open heater, a water inlet pipe leading into said heater, means for discharging reagents into the entering water to separate the impurities therein, a filter bed in the heater for removing said impurities, an outlet leading from the heater and into which the water is discharged from said filter bed, a gage glass applied to the heater to indicate the water level therein, a gage glass connected with the outlet to indicate the head of water therein, a float located in a chamber, connected with said outlet, and a regulating valve in the inlet pipe connected with the said float to increase the admission of water to the tank as the head in the outlet pipe decreases, substantially as described.

In testimony, that I claim the foregoing as my invention, I affix my signature in presence of two subscribing witnesses, this 5th day of Oct., A. D. 1904.

ADOLPH SORGE, JR.

Witnesses:
HENRY W. CARTER,
K. A. COSTELLO.